United States Patent [19]

Pimpinella et al.

[11] Patent Number: 5,694,511
[45] Date of Patent: Dec. 2, 1997

[54] OPTICAL SWITCHING APPARATUS AND METHOD FOR USE IN THE CONSTRUCTION MODE TESTING OF A MODULAR FIBER ADMINISTRATION SYSTEM

[75] Inventors: Richard Joseph Pimpinella, Hampton; Randy Alan Reagan, Morris Plains, both of N.J.

[73] Assignee: Lucent Technologies Inc., Murray Hill, N.J.

[21] Appl. No.: 709,943

[22] Filed: Sep. 9, 1996

[51] Int. Cl.[6] ............................................. G02B 6/36
[52] U.S. Cl. ........................ 385/134; 385/135; 385/147
[58] Field of Search ........................... 385/134, 135, 385/147

[56] References Cited

U.S. PATENT DOCUMENTS

| | | | |
|---|---|---|---|
| 5,074,635 | 12/1991 | Justice et al. | 385/135 |
| 5,204,925 | 4/1993 | Bonanni et al. | 385/89 |
| 5,241,617 | 8/1993 | Peacock et al. | 385/135 |
| 5,289,558 | 2/1994 | Teichler et al. | 385/135 |
| 5,353,367 | 10/1994 | Czosnowski et al. | 385/135 |
| 5,448,675 | 9/1995 | Leone et al. | 385/135 |
| 5,461,693 | 10/1995 | Pimpinella | 385/135 |

*Primary Examiner*—John Ngo

[57] ABSTRACT

A device and method for connecting an optical switch to the optical fibers that terminate on a fiber distribution shelf within a fiber administration system. The optical switch device contains a support plate that is shaped essentially the same as the protective cover of fiber distribution shelf. As such, the support plate of the optical switch device can be joined to a specific fiber distribution shelf by substituting the support plate for the protective cover. An optical switch is affixed to the support plate, wherein the optical switch is sized not to extend beyond the peripheral boundaries of the support plate. As a result, when the support plate is placed over a fiber distribution shelf, the optical switch joined to the support plate does not obscure any other fiber distribution shelf in the fiber administration system.

20 Claims, 6 Drawing Sheets

OPTICAL SWITCHING APPARATUS AND METHOD FOR USE IN THE CONSTRUCTION MODE TESTING OF A MODULAR FIBER ADMINISTRATION SYSTEM

RELATED APPLICATIONS

This application is related to the following:

U.S. patent application Ser. No. 08/645,108, entitled AN OPTICAL COMMUNICATIONS SYSTEM HAVING DISTRIBUTED INTELLIGENCE, Jennings 5-1-2-17 filed May 13, 1996;

U.S. patent application Ser. No. 08/709,978, entitled FIBER OPTIC OPERATION CENTER, filed Sep. 9, 1996; and U.S. patent application Ser. No. 08/713,576, entitled OPTICAL FIBER DISTRIBUTION SHELF ASSEMBLY CONTAINING A MODULAR OPTICAL SWITCH.

These applications are herein incorporated into this disclosure by reference.

BACKGROUND OF THE INVENTION

1. Field of the Invention

The present invention relates to optical switches used to connect optical fibers at a central office to a Remote Fiber Test System (RFTS), when the optical fibers are being laid, repaired or otherwise altered. More particularly, the present invention relates to an optical switch system that selectively directs optical test signals to optical fibers that are part of a fiber administration system when the integrity of those optical fibers are in question.

2. Description of the Prior Art

There are many applications that utilize an optical fiber network to establish optical communications between a host digital terminal (HDT) at a central office and an optical network unit (ONU) at a remote location. Since a central office serves as the point of origin for the optical fibers in the optical fiber network, fiber administration systems are typically used at the central office to manage the flow of optical signals as they are directed to the various ONUs along the different optical fibers in the network.

In many fiber administration systems, as the optical fibers in a network enter the central office, they are directed into an optical distribution frame where the individual optical fibers are terminated in an organized manner. Such fiber administration systems are exemplified by the LGX® fiber administration system which is currently manufactured by Lucent Technologies of Murray Hill, N.J., the assignee herein. In such fiber administration systems, the optical distribution frames used at the central office are typically large structures that are arranged in parallel rows. Each optical distribution frame is commonly mounted between the floor and ceiling and only a few feet separate each row of frames.

Each optical distribution frame located at the central office typically defines a plurality of bays, wherein each bay houses several fiber distribution shelves. On each of the fiber distribution shelves are optical couplings that receive the ends of all of the individual optical fibers that enter the central office and are contained within the optical fiber network. By terminating each optical fiber at a coupling on one of the different fiber distribution shelves, the location of each optical fiber becomes known within the overall assembly. Once terminated at a known address on one of the fiber distribution shelves, each optical fiber can be selectively coupled to a HDT or a variety of other optical equipment located at the central office. As a result, the optical signals sent along each optical fiber can be selectively controlled.

As an optical fiber cable is connected between the optical distribution frame at the central office and the various ONUs at remote locations, the many optical fibers contained within the fiber cable must be spliced at different points along the path. For example, the optical fibers in an optical fiber cable are typically spliced to connector fibers at the point where the optical fiber cable enters the central office. The connector fibers extend through conduits in the central office and lead to the optical fiber distribution frame. The various optical fibers are also commonly spliced at one or more manhole locations in between the central office and a grouping of ONUs. Lastly, each optical fiber is commonly spliced to a coaxial cable coupler at each ONU. As such, most every optical fiber is spliced in more than one location in between the central office and each ONU.

When an optical fiber cable is newly laid, repaired, sliced or otherwise altered, it is important to check the optical integrity in between the central office and each ONU. As a result, each time an optical fiber cable is altered, the integrity of the overall optical pathway must be tested. In the prior art, the testing of the integrity and quality of the optical pathway between the central office and each ONU is often performed manually. As such, in the prior art, such testing is often a costly and labor-intensive undertaking. Referring to FIG. 1, a typical prior art testing procedure will be described. In FIG. 1, a prior art fiber administration system 10 is shown. The fiber administration system 10 includes an optical fiber distribution frame 12 that is affixed in a set position to the floor of a central office. The fiber distribution frame defines a plurality of bays 15. Each bay 15 supports a plurality of fiber distribution shelves 14. The fiber distribution shelves 14 come in one of the three standard sizes, having a five inch height, a seven inch height or a nine inch height. A network of conduits 16 lead the various optical fibers to the fiber distribution shelves 14.

Referring to FIG. 2 a typical prior art fiber distribution shelf 14 is shown. The shelf 14 contains a rack of connection modules 22 that receive the various optical fibers, via connection ports 23 that are disposed on the face of the connection modules 22. A protective faceplate 24 connects to the front of the fiber distribution shelf 14 and prevents accidental contact with any optical leads that connect to the connector ports 23 on the connection modules 22. The faceplate 24 engages C-shaped hinge elements 26 disposed on the bottom front edge of the fiber distribution shelf 14. The faceplate 24 pivots about the C-shaped hinge elements 26 to a closed position where the faceplate completely covers the open end of the fiber distribution shelf 14. Once in a closed position, the faceplate 24 engages two locking ports 28 that are disposed near the top front edge of the fiber distribution shelf 14.

Returning to FIG. 1, a traditional testing cart 30 is shown. The cart 30 is used to test the integrity of the optical lines that terminate at each of the fiber distribution shelves 14. On the cart 30 is contained a optical switch 32 with a plurality of leads 34. The optical switch 32 is coupled to a free standing optical time domain reflectometer (OTDR) 35 and what ever other equipment is desired to produce a desired test pattern signal. To test the various optical fibers that lead into the optical fiber administration system 10, the cart 30 is rolled into position in front of the optical fiber distribution frame 12. The faceplate 24 (FIG. 2) on the fiber distribution shelves are then removed one at a time and the leads from the remote optical switch 32 are connected to the various connection ports contained on that shelf. After being connected, the remote optical switch 32 directs a generated test signal through each of the optical fibers that lead to that distribution shelf. By analyzing the test signals, the integrity and quality of each optical pathway termination at the targeted distribution shelf can be ascertained.

The problem with such a prior art testing method is that it requires a test cart 30 to be positioned in front of the optical fiber distribution frame 12 for testing to occur. In many applications, a central office has multiple optical fiber distribution frames that are positioned relatively close to one another. As a result, the positioning of a test cart 30 in front of one optical fiber distribution frame often blocks access to other optical fiber distribution frames. Furthermore, the presence of the cart 30 in front of one optical fiber distribution frame commonly blocks access to the fiber distribution shelves on the frame that are not part of the testing procedure. Matters are complicated by the fact that the cart 30 cannot be moved during a testing cycle else a false error my be detected by the test and the test would have to be repeated.

A need therefore exists in the art for an optical switch and testing apparatus that does not block or otherwise obscure access to alternate fiber distribution shelves contained on an optical fiber administration system.

A need also exists for a system and method that simplifies the coupling of optical fibers on fiber distribution shelves to testing equipment for construction mode testing.

SUMMARY OF THE INVENTION

The present invention is a device and method for connecting an optical switch to the optical fibers that terminate on a fiber distribution shelf within a fiber administration system. Fiber distribution shelves in a fiber administration system support modules that connect to external leads. Each fiber distribution shelf has a protective covers that covers the face of the fiber distribution shelf and protect the area where the external leads connect to the supported modules. The present invention optical switch device contains a support plate that is shaped essentially the same as the protective cover of fiber distribution shelf. As such, the support plate of the optical switch device can be joined to a specific fiber distribution shelf by substituting the support plate for the protective cover. The support plate attaches to the fiber distribution shelf using the hardware that is already present to retain the protective plate. An optical switch is affixed to the support plate, wherein the optical switch is sized not to extend beyond the peripheral boundaries of the support plate. As a result, when the support plate is placed over a fiber distribution shelf, the optical switch joined to the support plate does not obscure any other fiber distribution shelf in the fiber administration system. Leads from the optical switch extend through the support plate and connect to the modules on the fiber distribution shelf, wherein the presence of the overall optical switch device isolates the optical connections.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Figure 1:
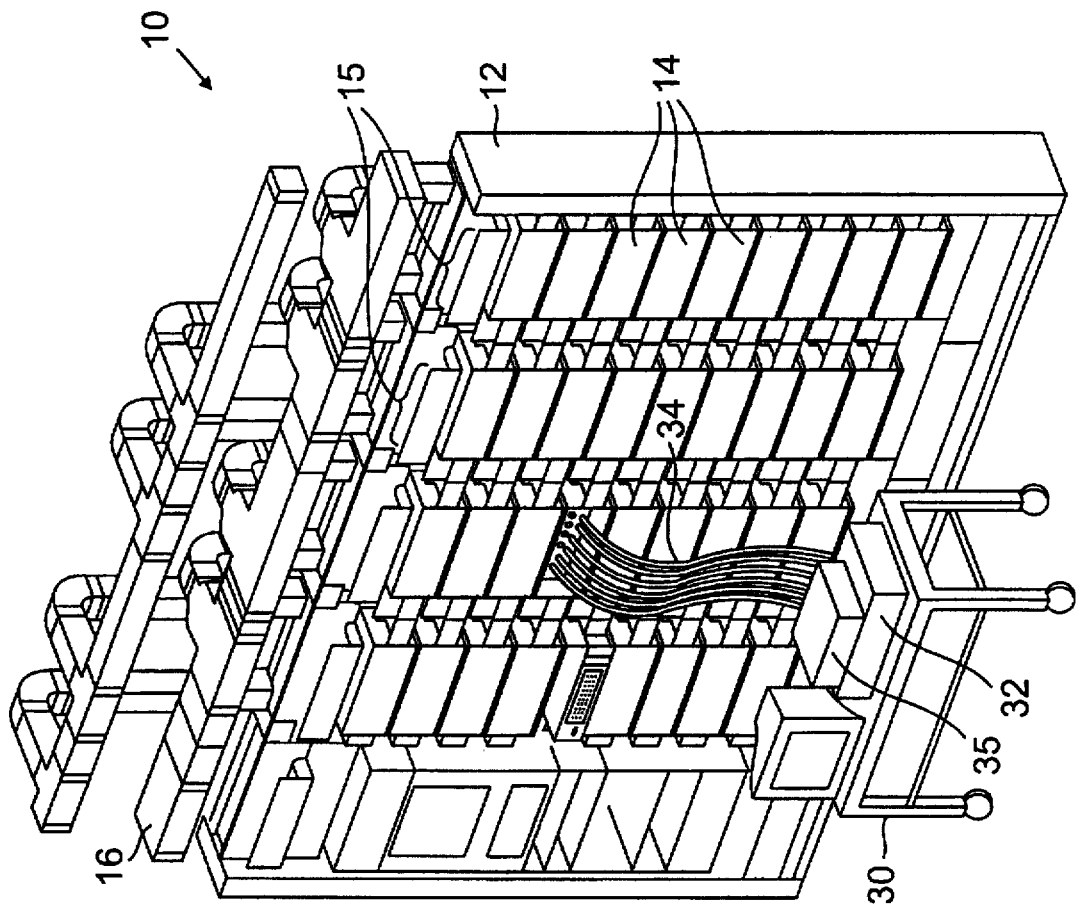
FIG. 1 is a perspective view of a prior art optical fiber distribution frame shown in conjunction with a prior art test cart for construction mode testing.
Figure 2:
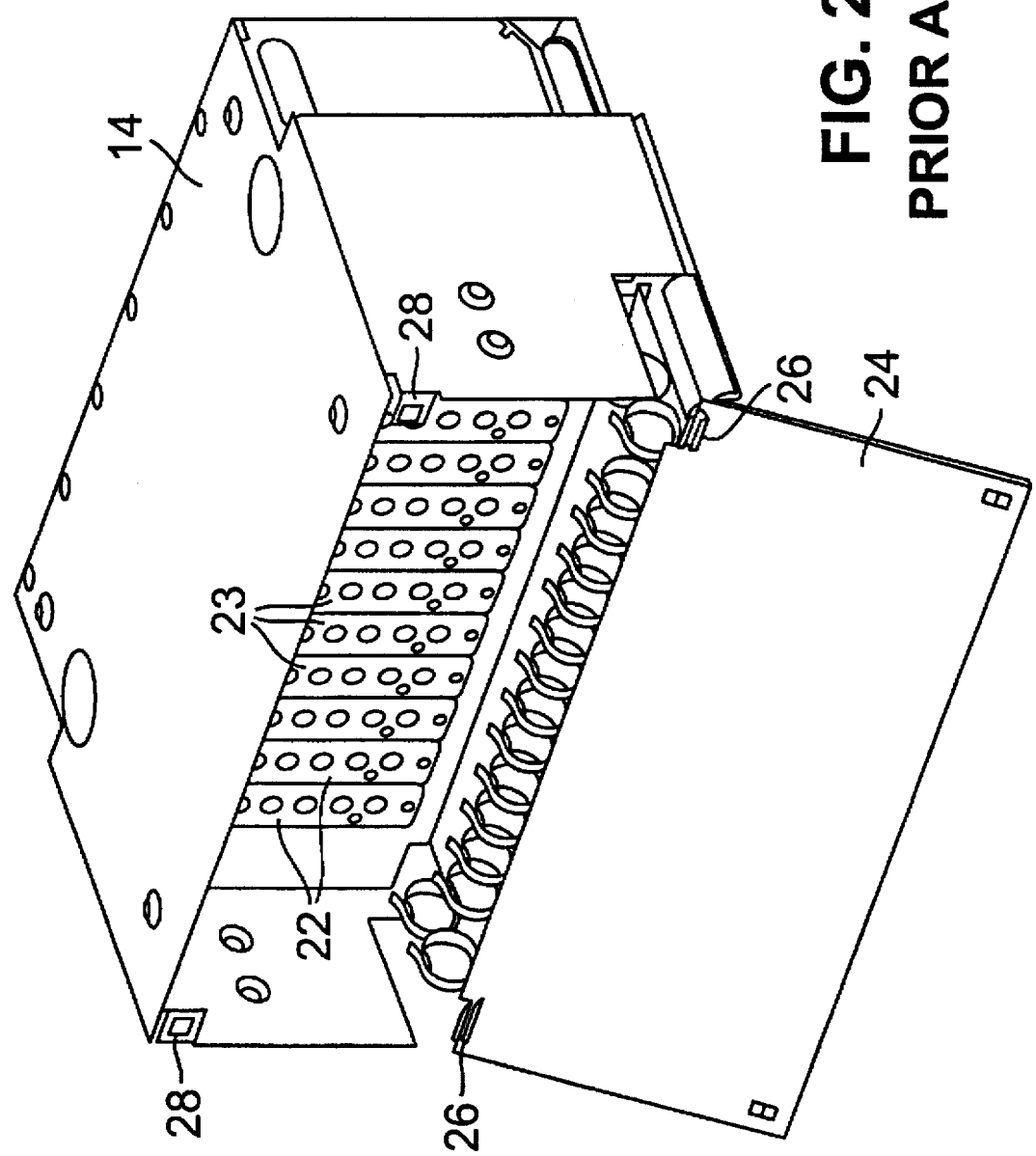
FIG. 2 is a perspective view of a prior art fiber distribution shelf contained within the optical fiber distribution frame of FIG. 1.
Figure 3:
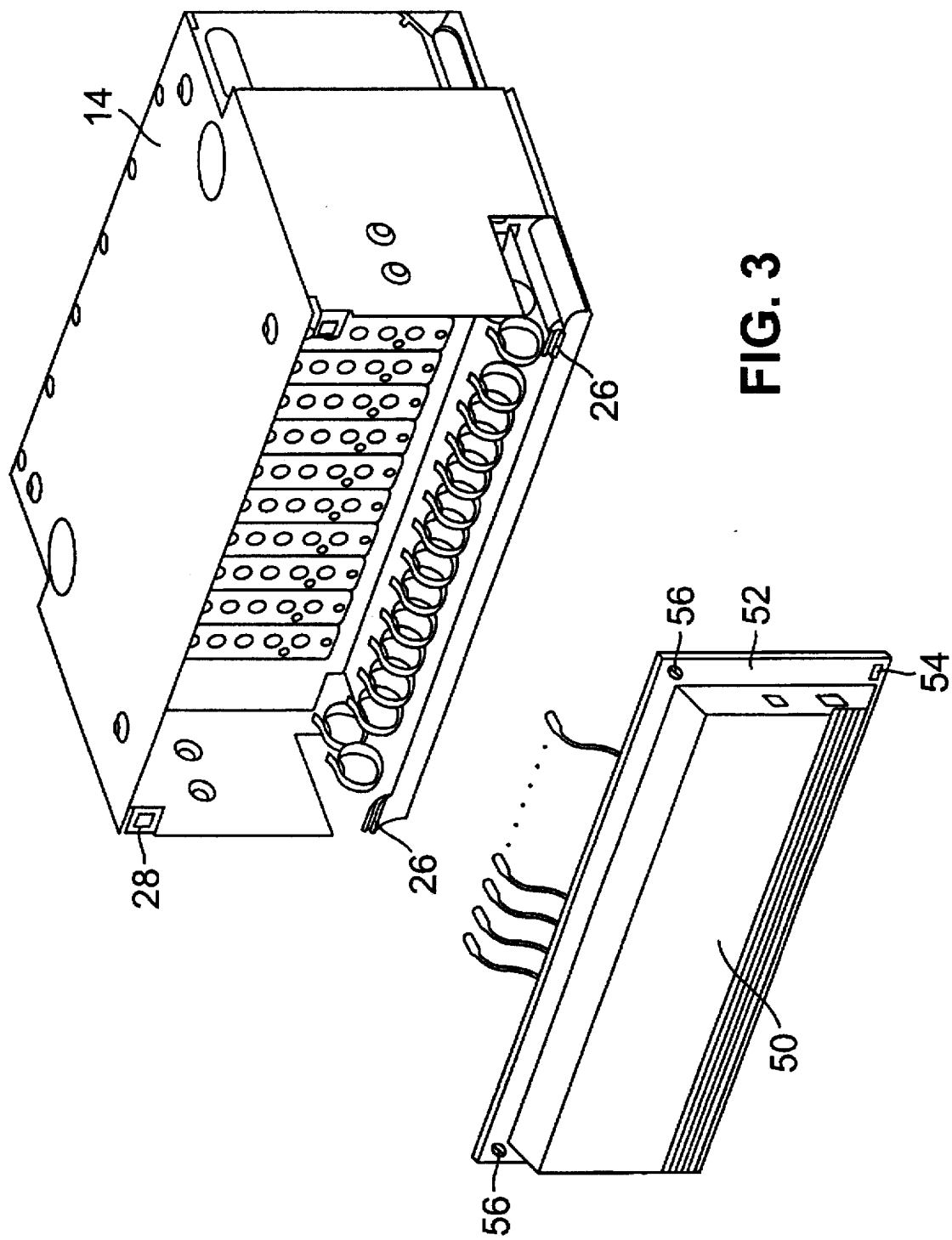
FIG. 3 is a perspective view of a prior art fiber distribution shelf shown in conjunction with one exemplary embodiment of the present invention optical switch device.

Referring to FIG. 3, an exemplary optical switching device 50 is shown in accordance with the present invention. The optical switching device 50 is shown in conjunction with a standard fiber distribution shelf 14, such as that previously shown and described in FIG. 2. The optical switching device 50 is affixed to a support plate 52 that is configured with peripheral dimensions that mimic the dimensions of a prior art faceplate 24 (FIG. 2). Accordingly, the support plate 52 has hinge pivots 54 that engage the C-shaped hinge elements 26 on the bottom front edge of the fiber distribution shelf 14. Similarly, the support plate 52 contains twist locks 56 that engage the locking apertures 28 that are disposed on the front top edge of the fiber distribution shelf 14. It will therefore be understood that the optical switching device 50 can be placed in front of a fiber distribution shelf 14 by removing the faceplate 24 (FIG. 2) that normally covers the open front of the shelf and replacing that faceplate with the support plate 52 that supports the optical switching device 50.

Figure 4:
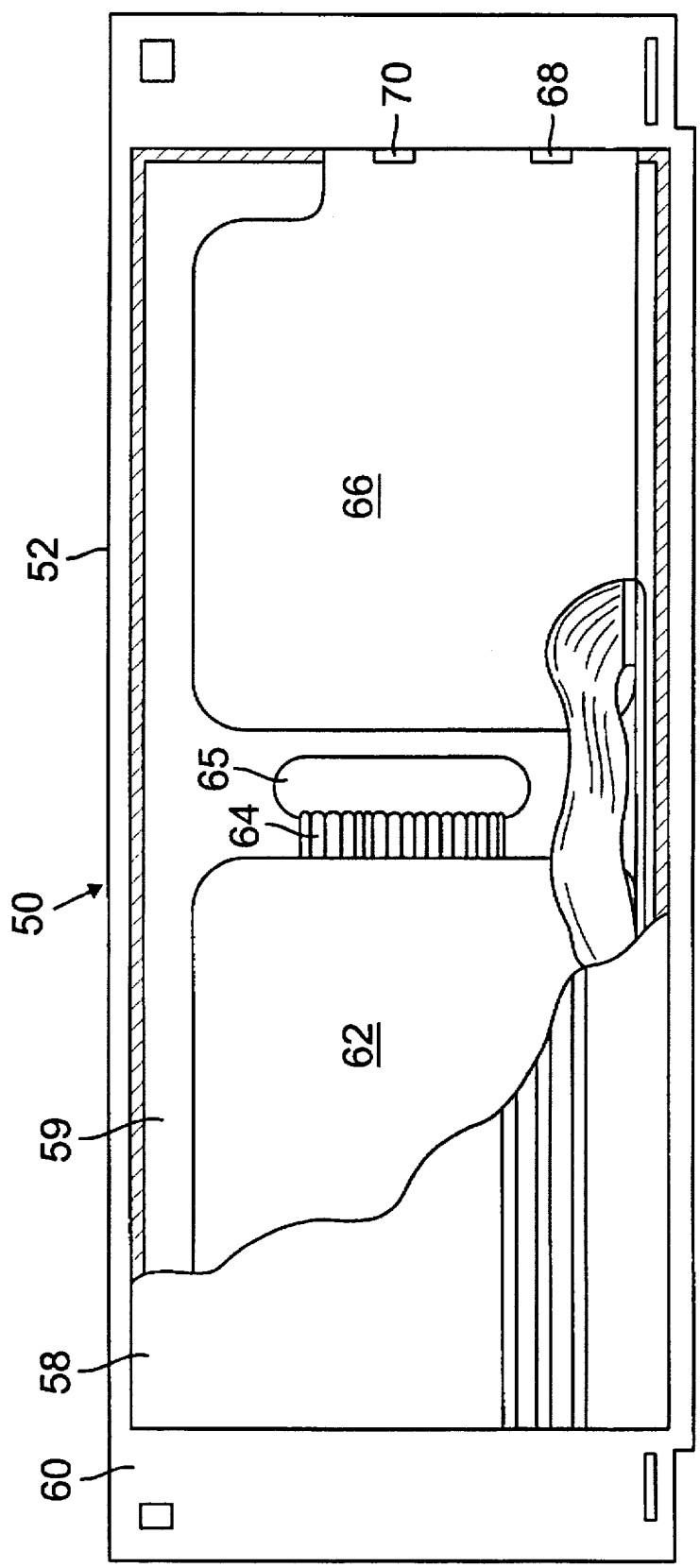
FIG. 4 is selectively cut-away front view of the exemplary embodiment of the optical switch device shown in FIG. 3.

Referring to FIG. 4. it can be seen that a housing 58 is provided that defines a chamber 59 against the front surface 60 of the support plate 52. Contained within the chamber 59 are the elements that create an optical switch. The form and function of an optical switch is well known in the prior art and need not be set forth herein. However, in the shown embodiment, the optical switch is divided into two distinct modules under the housing 58. The first module is an optical switching module 62 that contains most of the fiber optics and optical circuitry common to an optical switch. A plurality of test leads 64 extend from the optical module 62. The test leads 64 extend through an aperture 65 in the support plate 52 where they are held in a structure that will later be explained. The second module is an electronic control module 66 that controls the optical switching module 62. At the side of the electronic control module is an electrical connector 68 and an optical connector 70. The electrical connector 68 provides a means for supplying power to the optical switch device 50. The optical connector 70 provides a means for supplying an optical test signal to the optical switch device 50, wherein the optical switch device 50 selectively directs the optical test signal to the various leads 64 that extend from the optical switching module 62.

Figure 5:
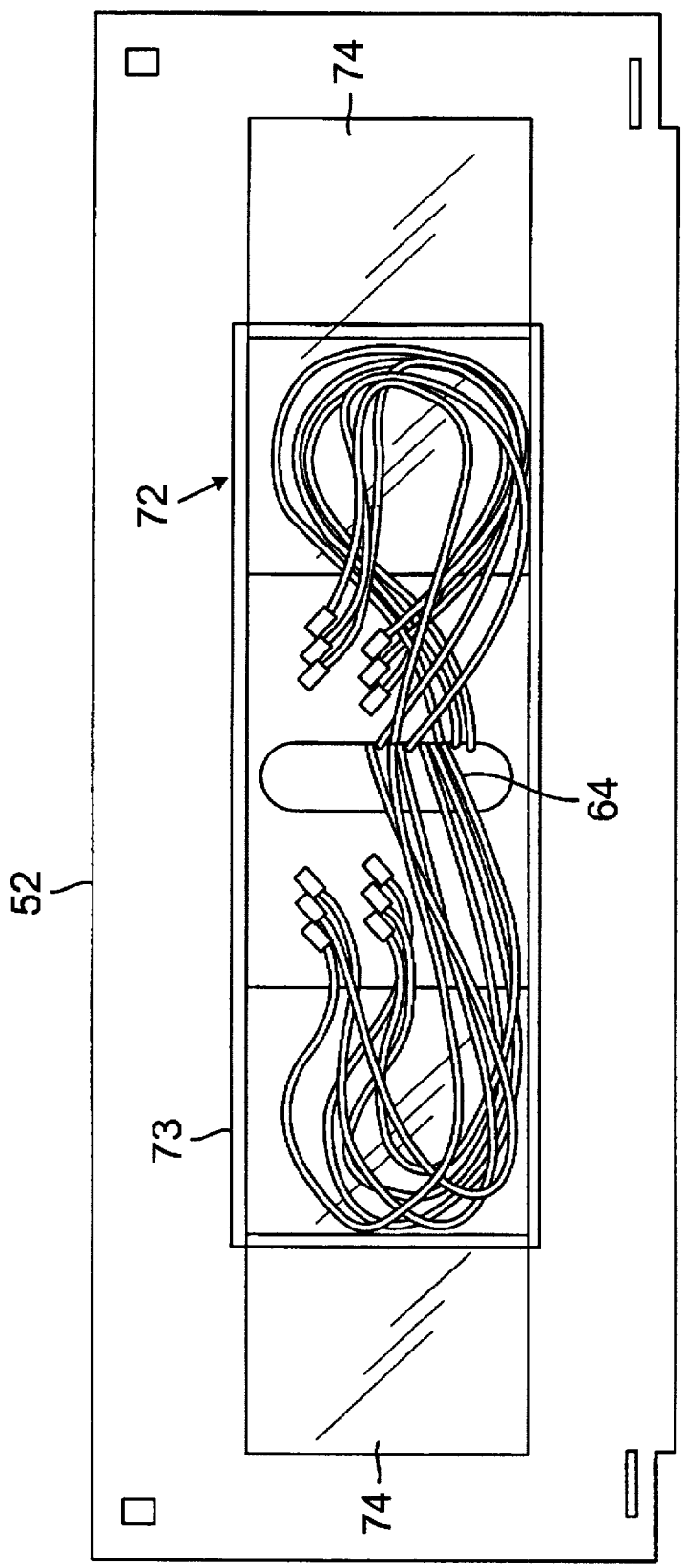
FIG. 5 is a rear view of the exemplary embodiment of the optical switch device shown in FIG. 3.

Referring to FIG. 5, it can be seen that a test lead storage structure 72 is disposed on the rear surface 74 of the support plate 52. The test leads 64 that originate from the optical switching module 62 (FIG. 4) extend into the test lead storage structure 72. There is no limitation in the number of test leads that may extend into the storage structure 72. However, for many applications the number of test leads will be between twelve and seventy-two. The test lead support structure 72 can be any structure capable of neatly holding all of the test leads 64 when they are not in use. In the shown embodiment, the test lead support structure 72 has a box configuration 73 with an open top. Two sliding panels 74 are provided that ride in grooves on near the open top. The sliding panels 74 meet in the center to completely seal the box configuration 73 when not in use. When in use, the two sliding panels 74 are moved away from one another, thereby exposing the open top of the box configuration 73. Once opened, the test leads 64 can be pulled out of the box configuration 73 and can be coupled to the connection ports of the modules supported on the fiber distribution shelf 14 (FIG. 4).

Figure 6:
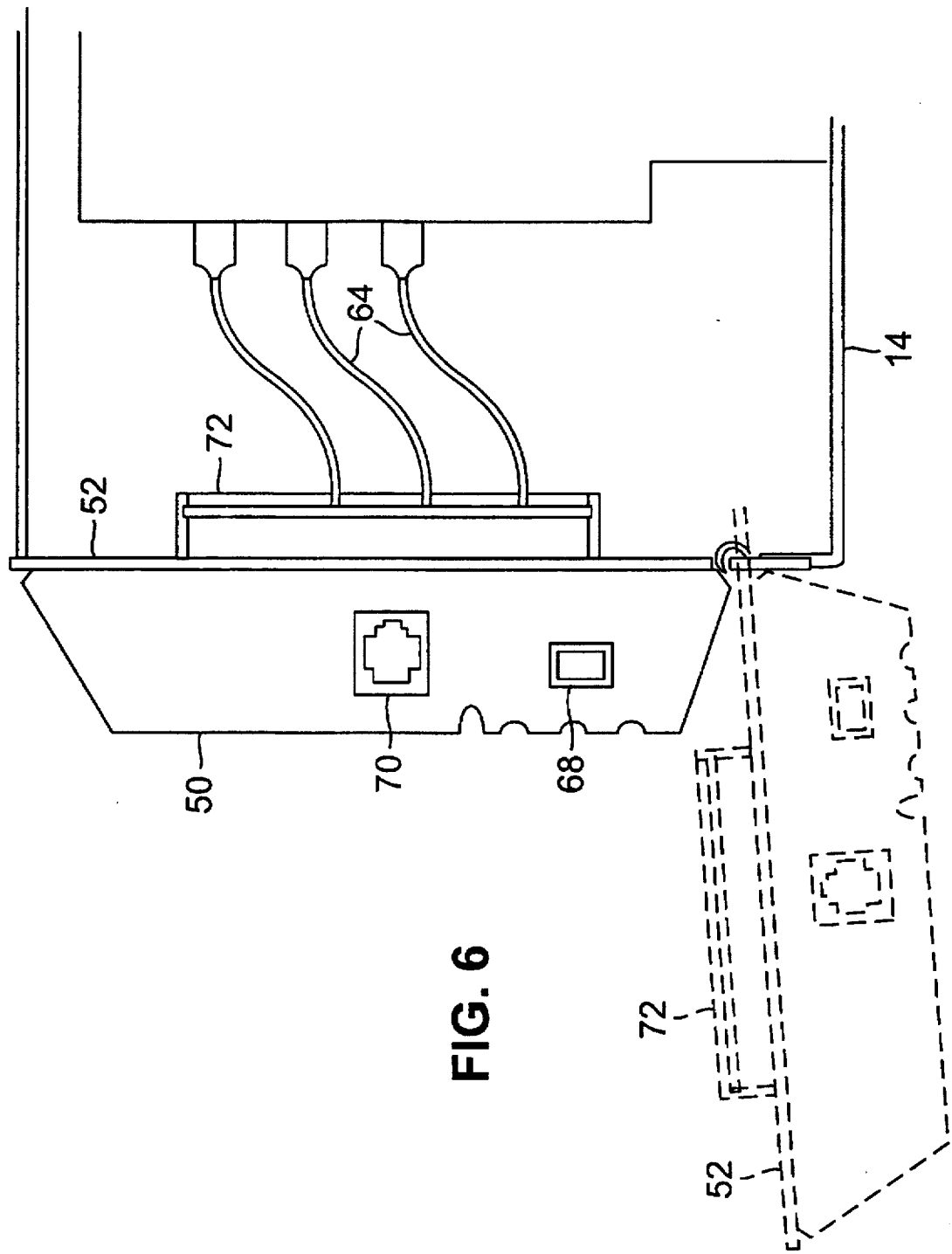
FIG. 6 is a side view of the exemplary embodiment of the optical switch shown in FIG. 3, viewed along section line 6—6.

Referring to FIG. 6, it can be seen that once the protective faceplate 24 (FIG. 2) of a fiber distribution shelf 14 is removed, the optical switch device 50 can be joined to the fiber distribution shelf 14 using the same hardware that is provided to retain the protective faceplate 24. When in an open condition, as shown in hidden lines, the support plate 52 of the optical switch device 50 lays at an angle of approximately 105° with respect to the vertical open face of the fiber distribution shelf 14. At this angle, the test lead support structure 72 is easily accessible and the optical switching device 50 itself does not interfere with the placement of the test leads 64 into the fiber distribution shelf 14.

When closed, the optical switch device 50 does not extend beyond the peripheral range that was previously occupied by the shelf faceplate 24 (FIG. 2). Additionally, the optical test device 50 only extends outwardly a few inches from the front of the fiber distribution shelf 14. Consequently, the optical switch device 50 does not interfere with any other fiber distribution shelf near the shelf that is subject to testing. This enables a person to have access any other fiber distribution shelf on the optical fiber distribution frame, regardless to the ongoing construction mode test. Furthermore, the support plate 52 of the optical switch device 50 acts as a closure, thereby protecting all of the test leads 64 from accidental contact while the construction mode test is being preformed.

Although the optical switch device 50 as described can be used on any prior art fiber administration system that used standard sized fiber distribution shelves, the optical switch device is preferably used in a fiber administration system with distributed intelligence, such as that described in U.S. patent application Ser. No. 08/645,108, entitled AN OPTICAL COMMUNICATIONS SYSTEM HAVING DISTRIBUTED INTELLIGENCE, filed May 13, 1996 and U.S. patent application Ser. No. 08/709,978, entitled FIBER OPTIC OPERATION CENTER, filed Sep. 9, 1996, both of which being previously incorporated by reference. In such a modular fiber administration system, an optical time domain reflectometer is provided as part of the system, as is a systems controller able to produce any required test signal sequence. As a result, when the optical switching device is joined to such a fiber administration system, the optical connector 70 leading into the optical switching device 50 can be coupled to the optical time domain reflectometer that serves the overall administration system. Furthermore, the electrical connector 68 that leads into the optical switching device 50 can be coupled to the systems controller that serves the overall fiber administration system. Consequently, the optical switching device 50 can be addressed and controlled by the programming of the systems controller. This eliminates the need for a separate optical time domain reflectometer and a separate controller, as was require in prior art testing systems.

It will be understood that the embodiments of the present invention specifically shown and described are merely exemplary and that a person skilled in the art can make alternate embodiments using different configurations and functionally equivalent components. All such alternate embodiments are intended to be included in the scope of this invention as set forth in the following claims.

What is claimed is:

1. In an optical fiber administration system having a frame structure and at least one fiber distribution shelf disposed within said frame structure, wherein said at least one fiber distribution shelf contains a plurality of optical connectors that are accessible through an open end of said shelf, an optical switch device comprising:

a support plate having a first side and a second side, wherein said support plate is sized to cover said open end of said fiber distribution shelf;

attachment mechanisms disposed between said support plate and said fiber distribution shelf, wherein said attachment mechanisms enable said support plate to be selectively positioned between a closed condition, where said support plate covers said open end, and an open condition, where said open end remains substantially unobstructed; and an optical switch affixed to said first side of said support plate, said optical switch having a plurality of leads extending therefrom that are capable of optically coupling to said plurality of optical connectors contained within the fiber distribution shelf.

2. The device according to claim 1, further including a lead support structure, disposed on said second side of said support plate, for retaining said plurality of leads in a confined area when not in use.

3. The device according to claim 1, wherein said support plate has a bottom edge and said attachment mechanisms include hinge elements that attach said bottom edge to said fiber distribution shelf.

4. The device according to claim 3, wherein said hinge elements includes a first element connected to said support plate and a second element connected to said enable fiber distribution shelf, wherein said first element and said second element are detachable from each other when said support plate is positioned at a predetermined orientation with respect to said fiber distribution shelf, thereby enabling said support plate to be selective removed from said fiber distribution shelf without tools.

5. The device according to claim 3, wherein said attachment mechanisms include locking elements that selectively lock said support plate in said closed condition.

6. The device according to claim 1, wherein support plate isolates said plurality of leads within said fiber distribution shelf when said support plate is in said closed condition, thereby preventing said plurality of leads from being inadvertently disturbed.

7. The device according to claim 3, wherein said hinge elements support said support plate in a plain approximately 105° from vertical when said support plate is in said open condition.

8. The device according to claim 1, wherein said optical switch includes an optical input port that is accessible by an external lead when said support plate is in said closed condition.

9. The device according to claim 1, wherein said optical switch includes an electrical input port that is accessible by an external lead when said support plate is in said closed condition.

10. The device according to claim 1, further including a housing that mounts to said first surface of support plate, wherein said housing defines an enclosure against said support plate that contains said optical switch.

11. The device according to claim 1, wherein said plurality of leads range in number from twelve to seventy-two.

12. In an optical fiber administration system having a frame structure and at least one fiber distribution shelf disposed within said frame structure, wherein said at least one fiber distribution shelf contains a plurality of optical connectors that are accessible through an open end of said shelf and said open end of said shelf is covered with a protective panel, a method of connecting an optical switch to said plurality of optical connectors comprising the steps of:

provinding a support plate that is substantially the same size as said protective cover;

mounting an optical switch to said support plate, wherein said optical switch contains a plurality of optical leads;

removing said protective panel from said fiber distribution shelf; and connecting said support plate to said fiber distribution shelf in place of said protective panel.

13. The method according to claim 12, wherein said step of connecting said support plate to said fiber distribution shelf includes the substeps of:

attaching said support plate to said fiber distribution shelf in an open position, wherein said support plate does not substantially obstruct said open end of said fiber distribution shelf;

connecting said plurality of optical leads to said plurality of optical connectors; and repositioning said support plate to a closed position, wherein said support plate obstructs said open end of said fiber distribution shelf and isolates said plurality of optical leads.

14. The method according to claim 13, wherein said step of mounting an optical switch to said support plate, includes mounting said optical switch to a first surface of said support plate, wherein said optical switch extends from said support plate and away from said fiber distribution shelf when said support plate is in said closed position.

15. The method according to claim 12, wherein said protective panel is coupled to hinge elements that extend from said fiber distribution shelf and said step of connecting said support plate to said fiber distribution shelf includes coupling said support plate to said hinge elements.

16. In an optical fiber administration system having a frame structure and a plurality of fiber distribution shelves disposed within said frame structure, wherein each fiber distribution shelf contains a plurality of optical fiber connectors that are accessible through an open end of said fiber distribution shelf and said open end of said fiber distribution shelf is covered with a protective panel, a method of testing optical fibers that lead to said optical fiber connectors, comprising the steps of:

mechanically connecting an optical switch assembly directly to said fiber distribution shelf, wherein said fiber distribution shelf supports said optical switch assembly on said frame;

optically connecting said optical switch assembly to said plurality of optical fiber connectors;

providing a test signal to said optical switch assembly wherein said optical switch assembly selectively directs said test signal to each of said plurality of optical fiber connectors.

17. The method according to claim 16, wherein said fiber administration system includes an optical time domain reflectometer and said step of providing a test signal to said optical switch assembly includes coupling said optical switch assembly to said optical time domain reflectometer.

18. The method according to claim 16, wherein said step of mechanically connecting an optical switch assembly directly to said fiber distribution shelf includes removing said protective panel and covering said open end of said fiber distribution shelf with said optical switch assembly.

19. The method according to claim 16, wherein said optical switch assembly includes a support plate that is substantially the same size as said protective cover and an optical switch that is mounted to one side of said support plate.

20. The method according to claim 19, wherein said step of mechanically connecting an optical switch assembly directly to said fiber distribution shelf includes removing said protective panel from said fiber distribution shelf and connecting said support plate to said fiber distribution shelf in place of said protective panel.

* * * * *